United States Patent Office 2,719,120
Patented Sept. 27, 1955

2,719,120
OIL-CONTAINING DRILLING FLUID

Joseph M. Barron, Port Arthur, Tex., assignor to Texaco Development Corporation, New York, N. Y., a corporation of Delaware No Drawing. Application April 22, 1953,
Serial No. 350,530

14 Claims. (Cl. 252—8.5)

The present invention relates to drilling of subsurface formations as in well drilling, and is particularly concerned with drilling fluids or muds, such as are used in rotary drilling operations, to lubricate the drilling bit, carry away the cuttings and deliver them to the surface, maintain a predetermined hydrostatic head upon the formation, protect the formation against penetration by materials from the bore hole and to perform a multitude of other functions.

The present invention is particularly concerned with oil containing drilling fluids which are valuable from the standpoint of high lubricity and avoidance of fluid loss into formations, together with the resulting damage of the formation and/or to the drilling fluid which may occur when aqueous phase constituents of the mud enter the formation in substantial amounts.

More specifically, the present invention contemplates subsurface drilling operations, as above, conducted in the presence of an aqueous drilling fluid comprising an oil-in-water emulsion in which the water carries emulsified oil particles as a dispersed phase, effective to inhibit water loss from the drilling fluid into the formation being drilled. The oil dispersion is effected and maintained by a relatively small proportion of an emulsifying agent comprising a saponified ester-type petrolatum oxidate in which the saponifying material is an element of the class consisting of sodium and calcium. In the presence of this specific emulsifying agent, relatively small quantities of oil assume a condition such that the lubricity and fluid loss of the resulting fluid compares with that of oil base muds in which the liquid phase is largely or entirely composed of oil.

The term ester-type petrolatum oxidate, as used herein, is specifically intended to mean an oxidation product of a petrolatum, characterized by a ratio of neutralization number and saponification number below about 0.25 and a Saybolt Universal viscosity at 210° F. above about 1500 seconds. Preferably the oxidate has a maximum neutralization number of about 35 and a saponification number between about 90 and 145, and its viscosity varies, for example, from 4,000 to 20,000 seconds and preferably 5,000 to 10,000 seconds, Saybolt Universal at 210° F.

Such products may be produced by reacting petrolatum, containing 1–25% and preferably 1–15% oil, with air, usually in the presence of a catalyst at an air feed rate of 10–35 standard cubic feet of air per pound of petrolatum per hour at a temperature between about 270 and 400° F. and at substantially atmospheric pressure.

Saponification is effected by direct reaction, as for example, by refluxing in the presence of a stoichiometric quantity of the appropriate saponifying agent, namely caustic soda or calcium hydroxide, as the case may be.

As will hereinafter appear, from the standpoint of the present invention, the sodium saponified product is distinctly superior in all respects to the calcium saponified product, and, therefore, constitutes the preferred embodiment thereof.

The present invention contemplates, of course, incorporating in the emulsion drilling fluid the usual mud constituents, as for example, clay and mud solids and/or weighting agents, such as barytes, calcium carbonate, silica, iron oxide, and the like. Depending upon the type of formations encountered and the results desired, the fluid may contain any of the usual modifying, converting or adjusting agents, such as caustic, quebracho or other dispersant, lime, starch, the various phosphates, and the like.

Ordinarily, because of its ready availability at the drilling site, the dispersed oil phase will ordinarily be crude oil, although a gas oil fraction such as diesel oil is advantageous. When possible, it is desirable to employ light distillate having a flash point sufficiently high to avoid fire hazard.

The resulting drilling fluid is referred to as an oil-in-water emulsion, by which is meant a drilling fluid, the liquid portion of which comprises a continuous phase of water or brine containing a minor proportion of oil emulsified therein as a dispersed or discontinuous phase.

Such drilling fluids are advantageous from the standpoint that they approximate the advantages of so-called oil base drilling muds, in which the liquid constituent is largely or entirely oil, without encountering the objectionably high cost of the oil base muds. Thus, in accordance with the present invention, the oil constitutes only a relatively small proportion of the liquid depended upon for mud fluidity, the bulk thereof being water, and therefore reflecting a sharp economic advantage to the extent that the amount of water is used instead of oil.

The present invention has the particular advantage of realizing an oil emulsion drilling fluid of especially low filtration loss with only small amounts of oil. This is believed to result from the fact that the saponified petrolatum oxidate in question inherently effects dispersion or emulsification of the oil in particles or droplets which, as to size, stability, and character, are particularly effective in tending to block the passage of the water through the mud cake which forms against the surface of the formation about the bore hole.

For example, the following table compares the water loss of four separate oil-emulsion muds prepared in accordance with the present invention on the basis of four typical aqueous drilling mud compositions, with water loss values realized when the same aqueous drilling mud formations are converted to oil-emulsion muds in accordance with optimum current practice:

| Base Mud | Emulsion-forming Additives | | | | | | Water Loss, cc./30 min. at 100 p. s. i. |
|---|---|---|---|---|---|---|---|
| | Jel Oil E (Proprietary preparation of tall oil soap in oil) | | Diesel Oil | | Na saponified oxidate concentrate | | |
| | Gals. | Percent of mix by volume | Gals. | Percent of mix by volume | Gals. | Net[1] pounds sap. oxidate per bbl. mix | |
| Rogers Lake-McKittrick light mud | | | | | | | 15.4 |
| Do | 8.4 | 20 | | | | | 5.4 |
| Do | | | 5.4 | 12.9 | 3 | 8 | 4.3 |
| Above with Quadrafos ¼ /bbl | | | | | | | 14.1 |
| Do | 8.4 | 20 | | | | | 5.1 |
| Do | | | 5.4 | 12.9 | 3 | 8 | 4.1 |
| Louisiana Mud | | | | | | | 9.0 |
| Do | 8.4 | 20 | | | | | 2.1 |
| Do | | | 5.4 | 12.9 | 3 | 8 | 2.6 |
| Limed Louisiana Mud | | | | | | | 9.5 |
| Do | 8.4 | 20 | | | | | 6.5 |
| Do | | | 5.4 | 12.9 | 3 | 8 | 3.9 |

[1] The sodium saponified oxidate employed is an aqueous solution of sodium saponified ester-type petrolatum oxidate containing 2⅔ pounds of saponified oxidate per gallon of water.

The Rogers Lake-McKittrick light mud of the foregoing table was a 1:1 mixture of the respective muds without further treatment. The Louisiana mud is hole mud from State West Cote Blanche Bay No. 47, New Iberia District, pretreated with one pound of caustic and one pound of quebracho per barrel of mud. The limed Louisiana mud sample was from the same source as above, prepared by pretreatment with 2 pounds of caustic and 2 pounds of quebracho, 5 pounds of lime and 2½ pounds Impermex (a proprietary mud starch) per barrel of mud.

The "Jel Oil E" of the foregoing control tests is the commercial, proprietary name of a product comprising saponified tall oil dissolved in diesel oil in the ratio of about 0.75 pounds of saponified tall oil per gallon of diesel oil. As previously intimated, this product was selected for comparative purposes on the basis of its wide commercial acceptance in the drilling art as representing actual current practice, and thus distinguishing over the proposed prior art practices which have proven fatally inferior in practice.

These results, therefore, clearly show that the oil emulsion mud produced in accordance with the present invention is not only the equal of, but is superior to the others commercially producible, in accordance with current practice.

It is to be further noted that in the above tests the actual amount of oil contained in the emulsion produced by the saponified petrolatum oxidate is also less than that employed in the controls, reflecting, therefore, a substantial decrease in oil requirement.

A yet further and even more important advantage of the present invention resides in the particular effectiveness of the muds of the present invention in connection with gypsum contaminated muds. As is known, gypsum or anhydrite, which are frequently encountered during drilling operation, tend to exert a detrimental effect upon drilling fluid constituents, including currently recognized emulsifiers. This results in a material deterioration in emulsion mud properties. The oil-in-water emulsion drilling fluids of the present invention, however, effectively obviate the problem of gypsum contamination and, in this respect, are far superior to currently known materials.

For example, a series of comparative tests were carried out using a 1:1 Rogers Lake-McKittrick light mud containing 5 pounds of added gypsum per barrel. Sufficient Impermex starch was also incorporated to minimize the resultant water loss.

In performing these tests the aqueous mud mixture was made up into oil-emulsion mud test samples of different composition by addition of the selected emulsion-forming additives. The following table lists, for the respective test samples, the water loss, as well as the amount of oil carried into the separated filtrate, thus establishing the relative ease with which the emulsified oil tends to separate from the mud and appear in the filtrate:

| Additions to Base Mud | | | | | Fluid Loss | | Percent Oil in Filtrate |
|---|---|---|---|---|---|---|---|
| Jel Oil E, percent of final mud | Diesel Oil, percent of final mud | Saponified Petrolatum Oxidate (lbs./bbl. final mud) | | Water, percent of final mud | cc./30 min. at 100 p. s. i. | Percent change | |
| | | Na | Ca | | | | |
| | 20 | | | | 17.0 | | 12.9 |
| .20 | | | | | 16.3 | −4.1 | 8.0 |
| | 20 | | 3 | | 14.5 | −14.7 | 4.8 |
| | 17.32 | 3 | | 2.68 | 13.6 | −20.0 | 0.0 |

These data show, therefore, that both the sodium and calcium saponified ester-type petrolatum oxidates are greatly superior to commercial tall oil emulsifying agents in the presence of contaminants, such as gypsum. Entirely apart from the foregoing, it is to be noted, moreover, that, with an increase in fluid loss, the separated filtrate contains increasing amounts of free oil in the recovered water. However, in the case of the gypsum contaminated oil-emulsion fluid emulsified with the calcium saponified petrolatum oxidate, the amount of free oil separating from the fluid and appearing in the filtrate is down to 4.8%.

On the other hand, in the test employing the sodium saponified petrolatum oxidate, the filtrate is entirely free from oil. This indicates that the character of the emulsion is such that it strongly resists separation of oil from the mud fluid with the filtrate, and is believed to evidence the phenomenon whereby the highly stabilized emulsion of oil particles resists passages through the mud cake and, in effect, tends to plug the interstices thereof to water flow.

Referring now more specifically to the character of the emulsifying agents herein contemplated, oxidates of an extremely wide variety and complexity are formed by the oxidation of petroleum fractions. It is, however, the saponification products of the ester-type petrolatum oxidate which alone appear to possess the properties herein disclosed as regards emulsion-type drilling fluids.

As above intimated, these possess a high ester content as indicated by a ratio of neutralization number to saponification number less than about 0.25 and having a Saybolt Universal viscosity at 210° F. above 1500 seconds. The starting material, petrolatum, is obtained by solvent dewaxing of residual oils and contains from 1-25 and preferably 1-15% oil. As has been shown in copending application Ser. No. 192,382, filed October 26, 1950, J. K. McKinley et al., and Serial No. 274,824, filed March 4, 1952, J. K. McKinley et al., this product is obtained by reacting the petrolatum with air in the presence of a catalyst under critical conditions of temperature, pressure and air feed rate, all as previously intimated in the present specification. Reference is therefore made to the aforesaid copending applications for more detailed disclosure insofar as they relate to the petrolatum wax oxidate herein contemplated.

For instance, the production of the oxidate is preferably effected in an aluminum lined reactor in the presence of a catalyst, such as potassium permanganate, which is employed in the amount of from about 0.01 to 1.0% of the total wax. Other suitable catalysts are, for example, manganese stearate, zinc stearate and manganese and zinc salts of the previously oxidized wax fractions. The preferred operating temperature range is 300-390° F. and at a pressure about atmospheric, by which is meant pressures up, approximately to 20 p. s. i. Oxidation is effected with a stream of air or similar oxygen-containing gas.

By way of example, 150 pounds of 20.5° A. P. I. gravity petrolatum having a Saybolt Universal viscosity at 210° F. of 86.6, a melting point of 151.8° F., and an oil content of 13.36% obtained by centrifuge dewaxing, and a refined residuum was charged to an aluminum reactor. There was also charged to the reactor an aqueous solution of potassium permanganate comprising 0.6 pound of potassium permanganate in 10 pounds of water. The reaction was effected by blowing air through the charge mixture while the mixture was maintained at a temperature of 330° F., at atmospheric pressure, and at an air rate of 20 cubic feet of air per pound of petrolatum per hour for a period of 6.25 hours. The resulting oxidate has a neutralization number of 26, a saponification number of 126, and a Saybolt Universal viscosity at 210° F. of 6211.

The oxidate was thereafter subjected to saponification, as above indicated. The sodium saponified product is that referred to in the first and second tables above, and the calcium saponified product is that referred to in the second table.

In general, the saponified ester-type petrolatum oxidates contemplated by the present invention are incorporated in the emulsion mix in amounts ranging from about 1-10 and preferably 4-8 pounds per barrel, of final drilling fluid. Likewise, the amount of emulsified oil may vary widely from, for example, as low as 5% by volume up to 50%. It will be apparent from the foregoing, however, that the usual objective is to realize the maximum benefits of oil incorporation with the minimum amount of oil. In general, the optimum lubricity and low water loss conditions may, as above indicated, be realized by use of relatively minor proportions of oil amounting, for example, to about 10-25% of the total emulsion fluid produced.

In a rotary drilling operation, the mud is, for example, continuously forced down the drill stem and through the end of the bit, continuously returning to the surface with the entrained cuttings, and meanwhile depositing a thin relatively immobile filter cake upon the porous formation surfaces which it encounters.

As further indicated, the resulting mud has a high stability and resistance to contamination, and is capable of continuously operating with a minimum loss of added oil.

Obviously many modifications and variations of the invention as herein set forth may be made without departing from the original spirit and scope thereof, and only such limitations should be imposed as are indicated in the appended claims.

I claim:

1. In the process of drilling through a subsurface formation wherein a drilling fluid is continuously circulated about a drilling bit, the improvement which comprises circulating through said drilling bit a drilling fluid comprising an aqueous liquid containing a dispersed phase of oil emulsified therein and a saponification product of an ester-type petrolatum oxidate characterized by a ratio of neutralization number to saponification number below about 0.25 and a Saybolt Universal viscosity at 210° F. above about 1500 seconds, said oxidate being saponified with a saponifying element of the class consisting of sodium and calcium.

2. A drilling process as called for in claim 1 wherein said saponification product is formed by the saponification of an ester-type petrolatum oxidate having a maximum neutralization number of about 35 and a saponification number in the range of about 90-145.

3. A drilling process as called for in claim 1 wherein said saponification product is formed by the saponification of an ester-type petrolatum oxidate, which oxidate is obtained by reacting a petrolatum containing about 1-15% of oil with air in the presence of a catalyst at an air feed rate of about 10-35 standard cubic feet of air per hour per pound of petrolatum charge at a temperature between about 270 and 400° F. and at substantially atmospheric pressure.

4. A drilling process as called for in claim 1 wherein said saponification product is the sodium saponified petrolatum oxidate.

5. A drilling process as called for in claim 1 wherein said saponification product is formed by the saponification of an ester-type petrolatum oxidate having a Saybolt Universal viscosity at 210° F. in the range of from about 4,000 to 20,000 seconds.

6. A drilling process as called for in claim 1 wherein said saponification product is formed by the saponification of an ester-type petrolatum oxidate having a Saybolt Universal viscosity at 210° F. in the range of from about 5,000 to 10,000 seconds.

7. A drilling fluid for use in the drilling of sub-surface formations comprising an aqueous liquid containing a dispersed phase of oil emulsified therein and including a saponification product of an ester-type petrolatum oxidate characterized by a ratio of neutralization number to saponification number below 0.25 and a Saybolt Universal viscosity at 210° F. above about 1500 seconds, said oxidate being saponified with a saponifying element of the class consisting of sodium and calcium.

8. A drilling fluid in accordance with claim 7 wherein said saponification product is formed by the saponification of an ester-type petrolatum wax oxidate having a maximum neutralization number of about 35 and a saponification number in the range of about 90-145.

9. A drilling fluid in accordance with claim 7 wherein said saponification product is formed by the saponification of an ester-type petrolatum oxidate, which oxidate is obtained by reacting a petrolatum containing about 1-15% of oil with air in the presence of a catalyst at an air feed rate of about 10-35 standard cubic feet of air per pound of wax charge per hour at a temperature between about 270-400° F. and at substantially atmospheric pressure.

10. A drilling fluid in accordance with claim 7 wherein said saponification product is the sodium saponified petrolatum oxidate.

11. A drilling fluid in accordance with claim 7 wherein said saponification product is formed by the saponification of an ester-type petrolatum oxidate having a Saybolt Universal viscosity at 210° F. in the range of from about 4,000 to 20,000 seconds.

12. A drilling fluid in accordance with claim 7 wherein said saponification product is formed by the saponification of an ester-type petrolatum oxidate having a Saybolt Universal viscosity at 210° F. in the range of from about 5,000 to 10,000 seconds.

13. A drilling fluid according to claim 7 wherein said saponification product is present in an amount in the range of about 1–10 pounds per barrel of drilling fluid and the oil is present in a minor proportion of the total liquids.

14. A drilling fluid according to claim 7 wherein said saponification product is present in an amount in the range of about 4–8 pounds per barrel of drilling fluid and the oil is present in an amount about 10–25% of the total liquids.

References Cited in the file of this patent

Van Dyke, Oil Emulsion Drilling Mud, article in World Oil, Nov. 1950, pages 101–104 and 106.

Rogers, Composition and Properties of Oil Well Drilling Fluids, 1st edition, pages 414 to 416, published 1948 by Gulf Pub. Corp. of Houston, Texas.